(12) United States Patent
Snelick et al.

(10) Patent No.: US 10,615,661 B2
(45) Date of Patent: Apr. 7, 2020

(54) ELECTRICAL GENERATOR AND A BEARING ASSEMBLY FOR AN ELECTRICAL GENERATOR

(71) Applicant: SAFRAN ELECTRICAL & POWER, Blagnac (FR)

(72) Inventors: John Gregory Snelick, Canal Fulton, OH (US); Kevin Patrick McCrea, Cuyahoga Falls, OH (US); Shayma Mouhammed, Sagamore Hills, OH (US)

(73) Assignee: SAFRAN ELECTRICAL & POWER, Blagnac (FR)

( * ) Notice: Subject to any disclaimer, the term of this patent is extended or adjusted under 35 U.S.C. 154(b) by 251 days.

(21) Appl. No.: 15/374,391

(22) Filed: Dec. 9, 2016

(65) Prior Publication Data

US 2017/0170704 A1    Jun. 15, 2017

Related U.S. Application Data

(60) Provisional application No. 62/266,205, filed on Dec. 11, 2015.

(51) Int. Cl.
*H02K 5/16* (2006.01)
*F16C 35/077* (2006.01)
(Continued)

(52) U.S. Cl.
CPC ........... *H02K 5/161* (2013.01); *F16C 19/525* (2013.01); *F16C 35/077* (2013.01);
(Continued)

(58) Field of Classification Search
CPC ............... F16C 19/525; F16C 2208/02; F16C 2208/40; F16C 2226/10; F16C 2326/43;
(Continued)

(56) References Cited

U.S. PATENT DOCUMENTS 3,777,195 A    12/1973 Potter
4,772,139 A *   9/1988 Bretton ................... F16C 27/04
                                                    384/535
(Continued)

FOREIGN PATENT DOCUMENTS

EP    2549136 A2    1/2013
FR    2065887 A5    8/1971
(Continued)

OTHER PUBLICATIONS

Published by RTP Imagineeing Plastics, RTP Polyetherketone (PEK) Data Sheet, 2005.*

(Continued)

*Primary Examiner* — Nguyen Tran
*Assistant Examiner* — Demetries A Gibson
(74) *Attorney, Agent, or Firm* — Rankin, Hill & Clark LLP

(57) ABSTRACT

A bearing assembly for an electrical generator includes a frame, a bearing liner, a bearing and a non-metallic ring. The frame is configured to connect with a housing of the electrical generator. The bearing liner is connected with the frame. The bearing is received in the bearing liner. The non-metallic ring is interposed between the bearing liner and the bearing.

19 Claims, 4 Drawing Sheets

(51) Int. Cl.
  *F16C 19/52* (2006.01)
  *H02K 7/08* (2006.01)
(52) U.S. Cl.
  CPC ...... *F16C 2208/02* (2013.01); *F16C 2208/40* (2013.01); *F16C 2226/10* (2013.01); *F16C 2326/43* (2013.01); *F16C 2380/26* (2013.01); *H02K 7/083* (2013.01)
(58) Field of Classification Search
  CPC .... F16C 2380/26; F16C 35/077; F16C 19/06; F16C 2300/02; F16C 27/04; F16C 17/02; F16C 17/022; F16C 33/046; H02K 5/161; H02K 7/083; Y10S 384/905; Y10T 403/213; Y10T 403/7061
  USPC ....................... 384/54–59, 535–537
  See application file for complete search history.

(56) References Cited

U.S. PATENT DOCUMENTS

| | | | |
|---|---|---|---|
| 5,044,784 A | 9/1991 | Lisowsky | |
| 5,998,894 A | 12/1999 | Raad | |
| 2003/0189382 A1* | 10/2003 | Tornquist | F16C 25/08 310/90 |
| 2009/0214148 A1* | 8/2009 | Lemmers | F16C 19/163 384/517 |
| 2012/0177311 A1* | 7/2012 | Isayama | F16H 57/082 384/416 |
| 2012/0186896 A1* | 7/2012 | Yamamoto | B62D 5/0448 180/444 |
| 2014/0077644 A1 | 3/2014 | Onishi | |
| 2015/0155754 A1* | 6/2015 | Ohashi | H02K 5/1732 310/90 |
| 2015/0204383 A1* | 7/2015 | Ishii | F04B 1/141 384/297 |
| 2016/0238151 A1* | 8/2016 | Carter | F16K 27/067 |

FOREIGN PATENT DOCUMENTS

| | | |
|---|---|---|
| FR | 2533294 A1 | 3/1984 |
| WO | 2015/034695 A1 | 3/2015 |

OTHER PUBLICATIONS

International Search Report/Written Opinion, PCT/US2016/065881, dated Mar. 16, 2017, 14 pages.
Chinese Office Action with English translation dated Jul. 2, 2019, Application No. 201680072959.3, 20 pages.
European Communication, Intention to Grant, Application No. 16823099.3, dated Jul. 12, 2019, 23 pages.

* cited by examiner

ELECTRICAL GENERATOR AND A BEARING ASSEMBLY FOR AN ELECTRICAL GENERATOR

BACKGROUND

This disclosure relates to electrical generators, and more particularly to electrical generators having bearings for supporting a rotor shaft.

In electrical generators, such as those used to power electrical systems of aircraft, the electrical generator is connected to the main engine of the aircraft by a drive shaft. The drive shaft is connected to a rotor assembly of the electrical generator through a rotor shaft. The rotor assembly is mounted on the rotor shaft and rotates within a stator assembly. The rotor shaft is supported for rotation in a generator housing using bearing assemblies.

The drive end of a known electrical generator includes a main bearing that floats axially in a liner bore of a bearing liner to accommodate differential thermal expansion and contraction. The floating main bearing fit in the liner bore is typically 0.076 mm (0.0003 inches) tight to 0.076 mm (0.0003 inches) loose for room temperature conditions. Because the bearing liner is made from aluminum and the outer ring of the main bearing is made from steel, clearances increase at operational temperatures. When a loose fit exists and operational vibration is present, there is a potential for fretting corrosion, which can result in a potential to restrict the axial motion of the main bearing in the bearing liner.

SUMMARY

In view of the foregoing, a novel electrical generator and a novel bearing assembly for an electrical generator is provided. The electrical generator includes a housing, a stator, a shaft, a rotor, a frame, a bearing liner, a bearing and a non-metallic ring. The stator is mounted in the housing. The shaft is provided in the housing and extends from the housing. The rotor is mounted on the shaft for rotation with the shaft. The frame is connected with the housing, and includes a frame opening through which the shaft extends. The bearing liner is connected with the frame. The bearing is received in the bearing liner. The non-metallic ring is interposed between the bearing liner and the bearing.

An example of a bearing assembly for an electrical generator includes a frame, a bearing liner, a bearing and a non-metallic ring. The frame is configured to connect with a housing of the electrical generator. The bearing liner is connected with the frame. The bearing is received in the bearing liner. The non-metallic ring is interposed between the bearing liner and the bearing.

A method of assembling an electrical generator includes inserting a bearing liner into a frame opening in a frame, the bearing liner including a first bearing support surface. The method further includes connecting the bearing liner with the frame. The method further includes affixing a non-metallic ring to the first bearing support surface, and inserting a first bearing in the non-metallic ring.

DETAILED DESCRIPTION

Figure 1:
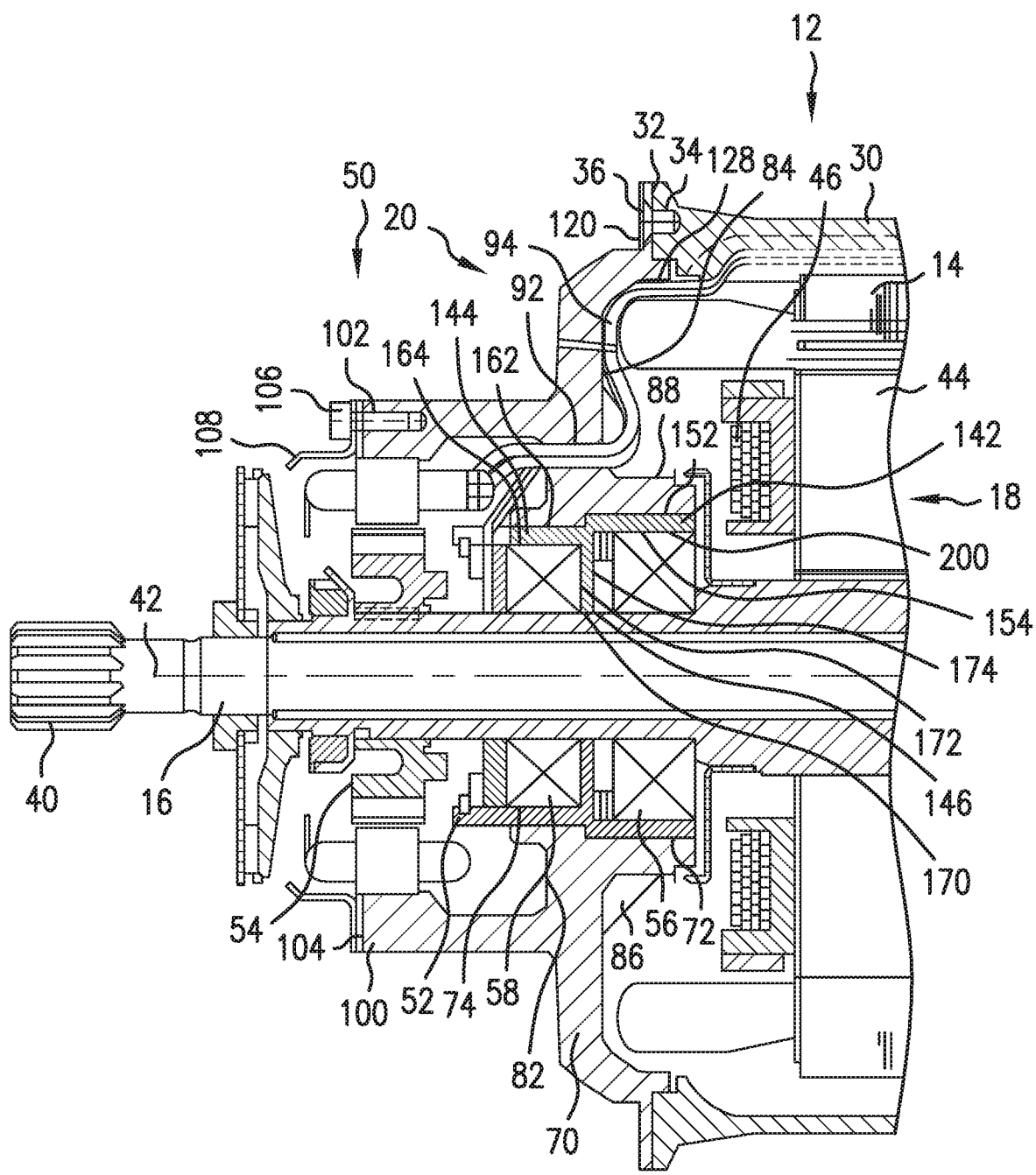
FIG. 1 is a cross-sectional view of a drive end of an electrical generator.

FIG. 1 depicts a drive end, which can also be referred to as a front end, of an electrical generator 10. The electrical generator 10 is similar to electrical generators used in many aircraft. The electrical generator 10 includes a housing 12, stator 14, a shaft 16, a rotor 18, and a bearing support assembly 20. The rear end of the electrical generator 10 is similar in configuration to known electrical generators, and is therefore not shown. Moreover, the components of the electrical generator 10 not discussed below are also similar to known electrical generators, and are therefore not discussed below.

The housing 12 includes an outer cylindrical housing wall 30 having a forward face 32 in which a plurality of fastener openings 34 (only one visible in FIG. 1) are provided for attaching the bearing support assembly 20 to the housing 12 using fasteners 36. The stator 14 is mounted inside of and is fixed to the outer cylindrical housing wall 30. The shaft 16, which can also be referred to as a rotor shaft, is provided in the housing 12 and extends from the housing 12 and the bearing support assembly 20. The shaft 16 includes a spline 40 at a front end for attachment to a main drive of an engine gear box (not shown). The rotor 18 mounts on the shaft 16 for rotation with the shaft 16. The rotor 18 rotates about a rotational axis 42 about which the housing 12 is centered. The rotor 18 includes a rotor core 44 and rotor windings 46. The housing 12, the stator 14, the shaft 16, and the rotor 18 can all be similar to those in a known electrical generator.

The bearing support assembly 20 includes a frame 50, which can also be referred to as an end bell, and a bearing liner 52. The frame 50 connects with the housing 12 and includes a centrally located frame opening 54 through which the shaft 16 extends. The bearing liner 52 connects with the frame 50, and the shaft 16 extends through the frame opening 54. The bearing liner 52 can be made from a hardened steel, and the frame 50 can be made from aluminum or magnesium. The bearing liner 52 is made from hardened steel to provide a low wear surface for a main bearing 56 and an auxiliary bearing 58, which can be similar to known bearings. The main bearing 56 operates as the primary bearing at the drive end of the electrical generator 10. The auxiliary bearing 58 is non-operational until the main bearing 56 fails.

In the depicted embodiment, the bearing liner 52 is press fit into the aluminum or magnesium frame 50 to connect the bearing liner 52 with the frame 50. When so fitted, the combined thermal expansion rate of the frame 50 and bearing liner 52 is greater than the thermal expansion rate of an outer ring for the main bearing 56 or the auxiliary bearing 58. Therefore, the bearing liner 52 expands away from the outer ring of either bearing 56 or 58, which increases the clearance between the two leading to fretting, corrosion, and reduced bearing system reliability.

Figure 4:
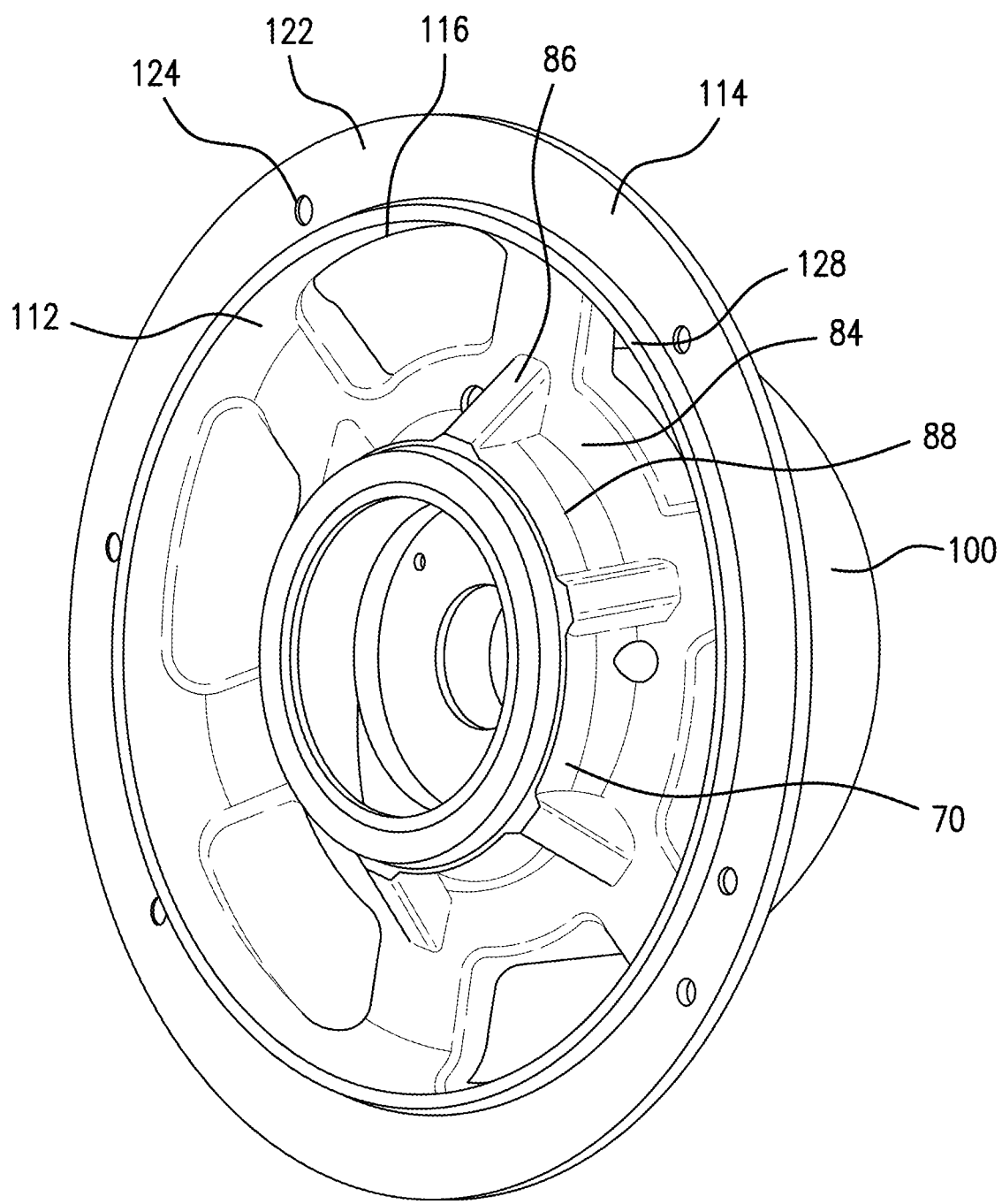
FIG. 4 is a perspective view of the bearing assembly of FIG. 2 with the non-metallic ring placed into the bearing liner and prior to formation of the anti-rotation feature.

As most clearly seen in FIG. 4, the frame 50 includes an inner annular section 70. With reference back to FIG. 1, the inner annular section 70 defines a rear cylindrical internal surface 72 and a forward cylindrical internal surface 74 separated by a shoulder 76, which is normal to the rotational axis 42 of the shaft 16. The rear cylindrical internal surface 72 has a larger inner diameter than an inner diameter of the forward cylindrical internal surface 74. The rear cylindrical internal surface 72 accommodates the main bearing 56 and the forward cylindrical internal surface 74 accommodates the auxiliary bearing 58. The inner annular section 70 further defines a forward face 82 and a rear face 84, both of which are oriented normal to the rotational axis 42 of the shaft 16. A plurality of integrally formed buttress features 86 (see also FIG. 4) interconnect the rear face 84 with a cylindrical outer surface 88 of the inner annular section 70. A lead opening 92 can be provided in the inner annular section 70 through which leads 94 can extend.

The frame 50 also includes a forward cylindrical section 100 that extends forwardly from the forward face 82. The forward cylindrical section 100 is also centered with respect to the rotational axis 42. The forward cylindrical section 100 also includes a plurality of fastener holes 102 (only one visible in FIG. 1) provided in a forward end face 104, which receive fasteners 106 to connect a cover 108 with the frame 50.

The frame 50 further includes a plurality of spokes 112 (see also FIG. 4) that extend in an outward radial direction from inner annular section 70. The spokes 112 are circumferentially spaced around the inner annular section 70 and connect with an outer circular flange 114 so as to define a plurality of openings 116 between the outer circular flange 114, the inner annular section 70, and adjacent spokes 112. The outer circular flange 114 defines a forward surface 120 and a rear surface 122. The forward surface 120 is parallel to the rear surface 122, and both surfaces 120, 122 are normal to the rotational axis 42. A plurality of bolt holes 124 are provided through the outer circular flange 114 extending from the forward surface 120 through the outer circular flange 114 to the rear surface 122. The bolt holes 124 align with the fastener openings 34 in the housing 12 to allow for the attachment of the frame 50 to the housing 12 through the use of the fasteners 36. The outer circular flange 114 also includes an axially extending mating flange 128 that keys with the housing 12 when connecting the frame 50 with the housing 12. The frame 50 in the illustrated embodiment is a single cast aluminum part.

The bearing liner 52 includes a rear cylindrical section 142, a forward cylindrical section 144 and an internal wall 146. The rear cylindrical section 142 includes a rear outer surface 152, which is cylindrical, and a first bearing support surface 154, which is a cylindrical inner surface. The forward cylindrical section 144 includes a forward outer surface 162, which is cylindrical, and a second bearing support surface 164, which is a cylindrical inner surface. The internal wall 146 extends into the bearing liner 52 and defines a central opening 170 through which the shaft 16 extends. The central opening 170 is circular and centered on the rotational axis 42.

Figure 2:
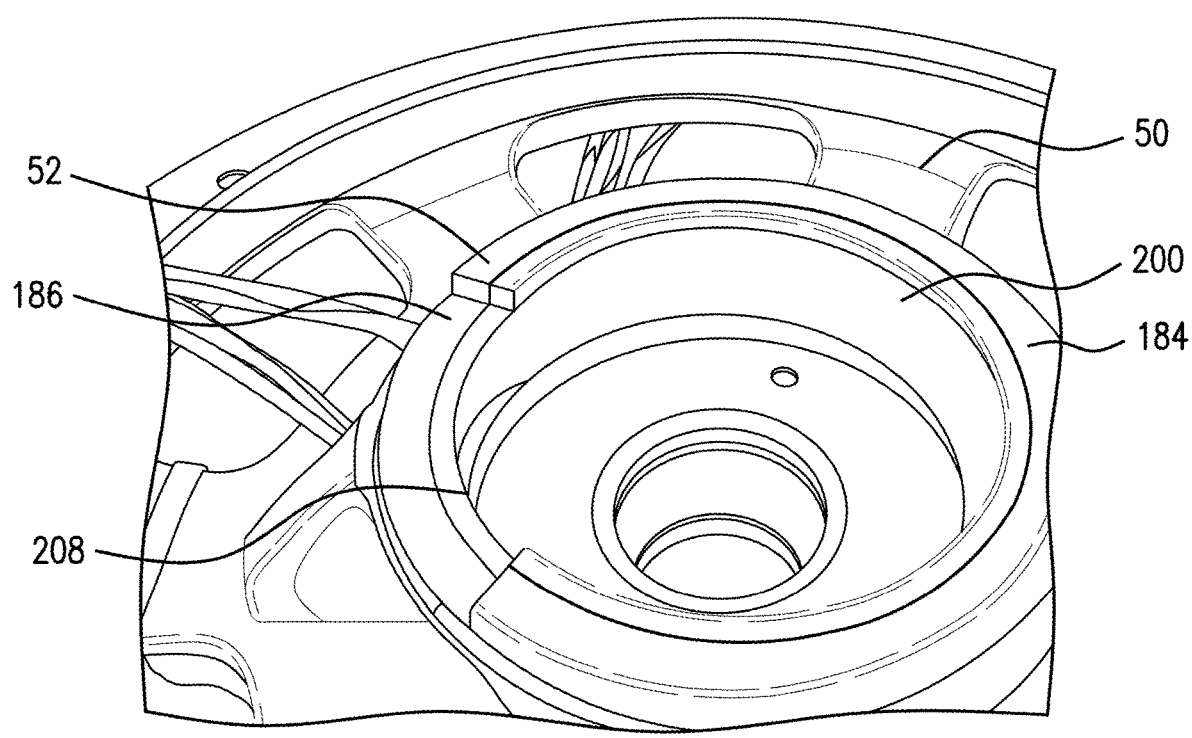
FIG. 2 is a perspective view of a bearing assembly for an electrical generator having an anti-rotation feature.

The first bearing support surface 154 and the second bearing support surface 164 are separated by the internal wall 146. The internal wall 146 includes a forward side 172 facing toward the second bearing support surface 164 and a rear side 174 facing toward the first bearing support surface 154. The forward side 172 is parallel with the rear side 174, and both sides 172, 174 of the internal wall 146 are planar and normal to the rotational axis 42, which can also be a centerline of the bearing liner 52. The first bearing support surface 154 is offset from a centerline of the bearing liner 52, which is co-axial with the rotational axis 42, a greater distance than a distance that the second bearing support surface 164 is offset from the centerline of the bearing liner 52. With reference to FIG. 2, the rear cylindrical section 142 defines a rear end face 184 normal to the centerline (rotational axis 42) of the bearing liner 52. An anti-rotation feature, e.g., a notch 186, is provided in the rear end face 184.

The main bearing 56 floats axially within the bearing liner 52. In the illustrated embodiment, a non-metallic ring 200, or cylinder, is interposed between the bearing liner 52 and the main bearing 56. When a loose fit exists between the main bearing 56 and the first bearing support surface 154 when no non-metallic ring 200 is present and high operational temperatures and operational vibration are present, there is a potential for fretting corrosion. The non-metallic ring 200 is placed between the main bearing 56 outer diameter and the first bearing support surface 154, which defines an inner diameter of the bearing liner 52, which eliminates metal to metal contact and eliminates, or greatly inhibits, fretting corrosion.

Figure 3:
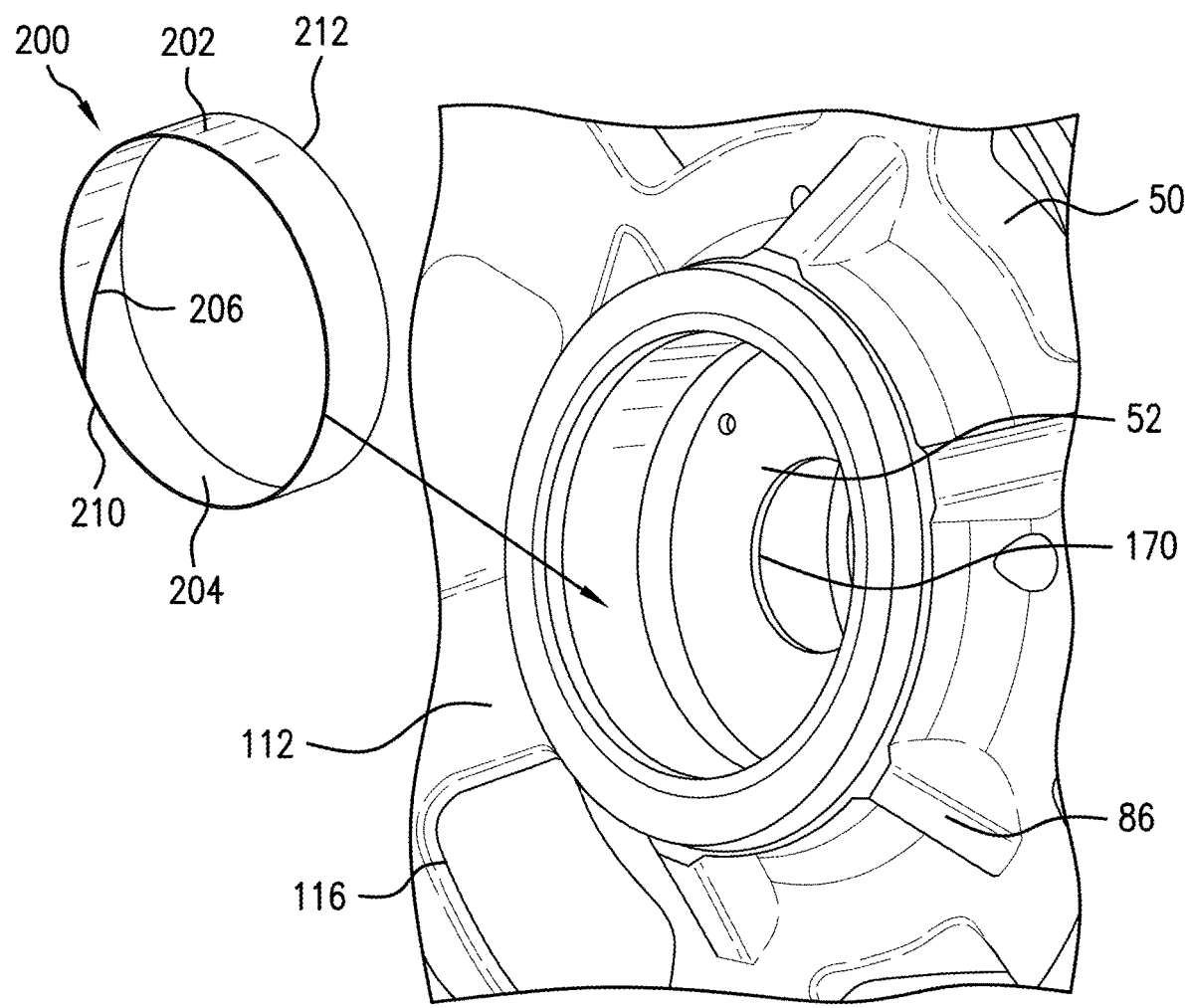
FIG. 3 is a perspective view of the bearing assembly of FIG. 2 with a non-metallic ring prior to placement into a bearing liner and prior to formation of the anti-rotation feature.

With reference to FIG. 3, the non-metallic ring 200 has an outer cylindrical ring surface 202, which defines an outer diameter of the non-metallic ring 200, and an inner cylindrical ring surface 204, which defines an inner diameter of the non-metallic ring 200. The outer diameter of the non-metallic ring 200 is equal to (matches) the inner diameter of the bearing liner 52 at the first bearing support surface 154. The inner diameter of the non-metallic ring 200 is equal to (matches) the outer diameter of the main bearing 56. The non-metallic ring 200 is very thin measured in a radial direction between the inner diameter and the outer diameter, e.g. between 0.108 inches and 0.162 inches. The non-metallic ring 200 is made from a material having sufficient lubricity to use with an axially floating bearing without a need for additional lubrication. The non-metallic ring 200 can be made from a graphite enhanced polyimide. Examples of such graphite enhanced polyimide materials include Vespel SP-21® available from E.I. du Pont de Nemours and Company and Meldin® 7000 available from Saint-Gobain Corporation. The non-metallic ring 200 can be made from a blend of a polymer, milled carbon fiber and graphite, such as the commercially available FibreComp® material from HyComp LLC. The non-metallic ring 200 could be made from other suitable materials having sufficient lubricity to use with an axially floating bearing without a need for additional lubrication.

The non-metallic ring 200 is bonded to the bearing liner 52, and more particularly to the first bearing support surface 154. The non-metallic ring 200 can be bonded to the bearing liner 52 using a suitable epoxy hardener or epoxy resin adhesive, examples including Loctite® E-20HP™ Hysol® and Loctite® E-30CL™ Hysol®. Manufacturing a radially thin ring of graphite filled polymer material can be difficult. As such, the non-metallic ring 200 can be manufactured with a larger diameter, and a diagonal split 206 can be made through the non-metallic ring 200, which aids in installation of the non-metallic ring 200 into the bearing liner 52. By providing the diagonal split 206 in the non-metallic ring 200, the initial larger circumference on the non-metallic ring 200 can be shortened prior to installation of the non-metallic ring 200 into the bearing liner 52. The shortened non-metallic ring 200 is then bonded into the bearing liner 52 on the first bearing support surface 154 and is then ground to final size. The non-metallic ring 200 can also be provided with a corresponding notch 208 (shown only in FIG. 2), which corresponds to the notch 186 in the bearing liner 52, provided in an outer edge 210 of the non-metallic ring 200. The outer edge 210 is circular and axially spaced with respect to the rotational axis 42 from an inner edge 212, which is also circular, of the non-metallic ring 200.

A method of assembling the electrical generator 10 includes inserting the bearing liner 52 into a frame opening 54 in the frame 50. The bearing liner 52 can be press fit into the frame 50 to connect the bearing liner 52 with the frame 50. As discussed above, the bearing liner 52 includes a first bearing support surface 154, which supports the main bearing 56.

The non-metallic ring 200 is affixed to the first bearing support surface 154 prior to or after attachment of the bearing liner 52 to the frame 50. As discussed above, the non-metallic ring 200 can be affixed to the first bearing support surface 154 using an appropriate epoxy. Prior to insertion of the non-metallic ring 200 into the bearing liner 52, the non-metallic ring 200 can be manufactured with a larger diameter, and a diagonal split 206 can be made through the non-metallic ring 200 to shorten the initial circumference of the non-metallic ring 200. The non-metallic ring 200 can then be inserted into the bearing liner 52, affixed to the first bearing support surface 154 and ground to a final size. The non-metallic ring 200 can also be ground to be substantially flush with the rear end face 184 of the rear cylindrical section 142 of the bearing liner 52. Material can be removed from the rear end face 184 of the rear cylindrical section 142 of the bearing liner 52 and the outer edge 210 of the non-metallic ring 200 to provide a notch 186 in the rear end face 184 and the corresponding notch 208 in the outer edge 210 of the non-metallic ring 200. The notches 186 and 208 can provide an anti-rotation feature.

The main bearing 56 is then inserted in the non-metallic ring 200. The assembly of the electrical generator 10 then proceeds in a manner similar to the assembly of known electrical generators, and is therefore not further described.

An electrical generator, a bearing assembly for an electrical generator and a method for assembling an electrical generator have been described above with particularity. Modifications and alterations will occur to those upon reading and understanding the preceding detailed description. The invention, however, is not limited to only the embodiments described above. Instead, the invention is broadly defined by the appended claims and the equivalents thereof. Moreover, it will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An electrical generator comprising:
a housing;
a stator mounted in the housing;
a shaft provided in the housing and extending from the housing;
a rotor mounted on the shaft for rotation with the shaft;
a frame connected with the housing, the frame including a frame opening through which the shaft extends;
a bearing liner connected with the frame;
a bearing received in the bearing liner; and
a non-metallic ring interposed between the bearing liner and the bearing, wherein the non-metallic ring is bonded to the bearing liner and includes a diagonal split.

2. The electrical generator of claim 1, wherein the non-metallic ring made from a graphite enhanced polyimide.

3. The electrical generator of claim 1, the non-metallic ring is made from a blend of a polymer, milled carbon fiber and graphite.

4. The electrical generator of claim 1, wherein the bearing liner includes a first bearing support surface and a second bearing support surface, wherein the first bearing support surface is offset from a centerline of the bearing liner a distance greater than the second bearing support surface, wherein the non-metallic ring is interposed between the first bearing support surface and the bearing.

5. The electrical generator of claim 1, wherein the bearing liner includes an, end face normal to a centerline of the bearing liner, and an anti-rotation feature s provided in the end face.

6. The electrical generator of claim 5, wherein the anti-rotation feature is a notch formed in the end face and a corresponding notch in the non-metallic ring.

7. The electrical generator of claim 6, wherein the rotor rotates about a rotational axis about which the housing is centered, the non-metallic ring defining an inner edge and an outer edge that are each circular, the outer edge being axially spaced with respect to the rotational axis, and wherein the corresponding notch in the non-metallic ring is provided in the outer edge of the non-metallic ring.

8. The electrical generator of claim 1, wherein the non-metallic ng is made of a material that has sufficient lubricity to use with the bearing without a need for additional lubrication.

9. A bearing assembly for an electrical generator comprising:
a frame configured to connect with a housing of the electrical generator;
a bearing liner connected with the frame;
a bearing received in the bearing liner; and
a non-metallic ring interposed between the bearing liner and the beating, wherein the non-metallic ring is bonded to the bearing liner and includes a diagonal split.

10. The bearing assembly of claim 9, wherein the non-metallic ring is made from a graphite enhanced polyimide.

11. The bearing assembly of claim 9, the non-metallic ring is made from a blend of a polymer, milled carbon fiber and graphite.

12. The bearing assembly of claim 9, wherein the bearing liner includes a first bearing support surface and a second bearing support surface, wherein the first bearing support surface is offset from a centerline of the bearing liner a distance greater than the second bearing support surface, wherein the nor-metallic ring is interposed between the first bearing support surface and the bearing.

13. The bearing assembly of claim 9, wherein the bearing liner includes an, end face normal to a centerline of the bearing liner, and an anti-rotation feature is provided in the end face.

14. The bearing assembly of claim 13, wherein the anti-rotation feature is a notch formed in the end face and a corresponding notch in the non-metallic ring.

15. The bearing assembly of claim 14, wherein the non-metallic ring defines an inner edge and an outer edge that are each circular, the outer edge being axially spaced with respect to a rotational axis of the electrical generator, wherein the corresponding notch in the non-metallic ring is provided in the outer edge of the non-metallic ring.

16. The bearing assembly of claim 9, wherein the non-metallic ring is made of a material that has sufficient lubricity to use with the bearing without a need for additional lubrication.

17. A method of assembling an electrical generator comprising:
- inserting a bearing liner into a frame opening in a frame, the bearing liner including a first bearing support surface;
- connecting the bearing liner with the frame;
- affixing a non-metallic ring to the first bearing support surface using an epoxy;
- providing a diagonal split in the non-metallic ring;
- inserting a first bearing in the non-metallic ring; and
- grinding an outer edge of the non-metallic ring to be at least substantially flush with an end face of the bearing liner.

18. The method of claim 17, further comprising removing material from the end face and the outer edge of the non-metallic ring to provide a notch in the end face and a corresponding notch in the outer edge of the non-metallic ring.

19. The method of claim 17, wherein the outer edge of the non-metallic ring is ground to be at least substantially flush with the end face of the bearing liner after the non-metallic ring is inserted into the bearing liner.

\* \* \* \* \*